United States Patent [19]
Inoue et al.

[11] Patent Number: 5,642,652
[45] Date of Patent: Jul. 1, 1997

[54] BOOSTER

[75] Inventors: Hidefumi Inoue; Masahiro Ikeda, both of Saitama-ken, Japan

[73] Assignee: Jidosha Kiki Co., Ltd., Tokyo, Japan

[21] Appl. No.: 681,307

[22] Filed: Jul. 22, 1996

[30] Foreign Application Priority Data

Aug. 4, 1995 [JP] Japan .................................. 7-219490

[51] Int. Cl.$^6$ ...................................................... F15B 9/10
[52] U.S. Cl. ........................................................... 91/376 R
[58] Field of Search ................................. 91/369.1, 369.2, 91/369.3, 376 R

[56] References Cited

U.S. PATENT DOCUMENTS

| | | | |
|---|---|---|---|
| 4,524,584 | 6/1985 | Kobayashi . | |
| 4,545,206 | 10/1985 | Kobayashi . | |
| 4,572,055 | 2/1986 | Schiel ............................... | 91/376 R X |
| 4,643,075 | 2/1987 | Wagner ............................. | 91/376 R X |
| 4,885,979 | 12/1989 | Macht et al. ...................... | 91/376 R X |
| 5,367,941 | 11/1994 | Gautier et al. .................... | 91/376 R X |
| 5,433,135 | 7/1995 | Watanabe .......................... | 91/376 R |
| 5,564,326 | 10/1996 | Gautier et al. .................... | 91/376 R X |

OTHER PUBLICATIONS

Drawing figures of U.S. Serial No. 06/701 478 (2 sheets) Filing Date: Feb. 14, 1985.

*Primary Examiner*—Hoang Nguyen
*Attorney, Agent, or Firm*—Flynn, Thiel, Boutell & Tanis, P.C.

[57] ABSTRACT

An improvement of a valve mechanism used in the booster is disclosed. A first and a second valve seat are formed so as to face forward while a valve element is disposed so as to face rearward in opposing relationship with both valve seats. Thus, the both valve seats and the valve element are disposed in an arrangement which is opposite from that used in a conventional valve mechanism. Such an arrangement allows the atmosphere valve to be located radially outward of the vacuum valve, thus permitting the diameter of the atmosphere valve to be increased as compared with a conventional booster. This enables the operational response of the booster to be improved.

4 Claims, 2 Drawing Sheets

BOOSTER

FIELD OF THE INVENTION

The invention relates to a booster as may be used in a brake of an automobile, and more particularly to an improvement of a valve mechanism therefor.

DESCRIPTION OF THE PRIOR ART

A booster is known in the art including a tubular valve body slidably disposed within a shell and having its outer periphery located at its rear end projecting externally of the shell, a power piston mounted on the valve body, a constant pressure chamber and a variable pressure chamber formed across the power piston, a valve mechanism formed within the valve body for controlling an opening/closing of a flow path within the valve body in response to a forward or a retracing movement of an input shaft, a constant pressure passage providing a communication between the constant pressure chamber and the valve mechanism, a variable pressure passage providing a communication between the variable pressure chamber and the valve mechanism, and an atmospheric passage formed by a space located between the inner periphery of the valve body and the outer periphery of the input shaft and extending from the valve mechanism to a rear opening for providing a communication between the valve mechanism and the atmosphere. The valve mechanism comprises a first valve seat formed on the valve body, a second valve seat formed on a valve plunger which is slidably fitted in the valve body and located radially inward of the first valve seat, a valve element adapted to be seated upon either valve seat, a first spring for urging the valve element toward either valve seat, and a second spring for returning the valve plunger and its associated input shaft to their inoperative positions.

In the conventional booster as mentioned, the both valve seats are formed so as to face rearward while the valve elements are formed to face forward so as to be opposite to the both valve seats. The constant pressure passage is formed radially outward of the first valve seat, and a combination of the first valve seat and a seat area of the valve element which moves into and out of engagement therewith defines a vacuum valve which opens or closes the constant pressure passage. On the other hand, the atmospheric passage is formed radially inward of the second valve seat, and a combination of the second valve seat and a seat area of the valve element which moves into and outward engagement therewith defines an atmosphere valve which opens or closes the atmospheric passage. The first spring is disposed between the back side of the valve element and the input shaft while the second spring is disposed between the inner periphery of the valve body and the input shaft.

In the inoperative position of such a conventional booster, the resilience of the second spring causes the valve plunger and the input shaft to be retracted to their rearward inoperative positions while simultaneously the first spring causes the seat area of the valve element to be seated upon the first valve seat, thus closing the atmosphere valve, while the seating area of the valve element is removed from the second valve seat to open the vacuum valve. Under this condition, because the atmosphere valve is closed, the inside and the rear side of the valve element assume the atmospheric pressure while the outside and the forward side of the valve element assume a negative pressure, whereby a pressure differential across the valve element causes the valve element to be urged forwardly. Accordingly, in order to prevent the vacuum valve from being closed as a result of a movement of the valve plunger and the valve element in the forward direction under the influence of the pressure differential, the second spring is preset to a given load so that the load set on the second spring is sufficient to overcome the pressure differential.

On the other hand, it is to be noted that it is desired in the prior art that the diameter of the atmosphere valve be increased in order to improve the operational response of the booster. However, if it is attempted to increase the diameter of the atmosphere valve in an arrangement as found in the conventional booster mentioned above, the pressure differential which urges the valve element forwardly under the inoperative condition mentioned above increases in magnitude. This requires that the load set on the second spring be increased in order to maintain the vacuum valve open under the inoperative condition. However, increasing the load which is set on the second spring results in a disadvantage that an input required to commence the operation of the booster becomes increased.

SUMMARY OF THE INVENTION

In view of the foregoing, in a booster including a tubular valve body slidably disposable within a shell and having its outer periphery located at its rear end projecting externally of the shell, a power piston mounted on the valve body, a constant pressure chamber and a variable pressure chamber defined across the power piston, a valve mechanism formed within the valve body for controlling to open or close a flow path within the valve body in response to a forward or retracting movement of an input shaft, a constant pressure passage providing a communication between the constant pressure chamber and the valve mechanism, a variable pressure passage providing a communication between the variable pressure chamber and the valve mechanism, and an atmospheric passage formed by a space located between the inner periphery of the valve body and the outer periphery of the input shaft and extending from the valve mechanism to a rear opening for providing a communication between the valve mechanism and the atmosphere, the valve mechanism including a first valve seat formed on the valve body, a second valve seat formed on a valve plunger which is slidably fitted in the valve body and located radially inward of the first valve seat, a valve element adapted to be seated upon either valve seat, a first spring for urging the valve element toward either valve seat, and a second spring for returning the valve plunger and its associated input shaft to their inoperative positions, in accordance with the invention, the both valve seats are formed so as to face forwardly while the valve element are disposed so as to face rearward in opposing relationship with the both valve seats, a combination of the first valve seat and a seat area of the valve element which seats upon it defining an atmosphere valve which opens or closes the atmospheric passage, and a combination of the second valve seat on the valve plunger and a seat area of the valve element which moves into an out of engagement therewith defining a vacuum valve which opens or closes the constant pressure passage.

With the construction according to the invention, the atmosphere valve may be located radially outward of the vacuum valve, whereby it is possible to increase the diameter of the atmosphere valve as compared with a booster of the prior art. In this manner, the operational response of the booster can be improved.

In the inoperative condition of the booster, the valve element which is urged rearward by the first spring will be seated upon the first valve seat formed on the valve body to close the atmosphere valve while the valve plunger and the input shaft are urged rearward by the second spring to maintain the vacuum valve open.

By choosing the size of an effective diameter of the valve element to be substantially equal to or slightly greater than that of the atmosphere valve, it is possible that the first spring be set to a load having a magnitude which is sufficient to prevent the valve element from being opened under the influence of a pressure differential between the atmosphere and a negative pressure while maintaining the valve element in abutment against the second valve seat. The second spring may also be set to a load of a magnitude which is required to push back the valve plunger, which is driven forward by a pressure differential. Accordingly, the loads to which the first and second spring are set may be reduced in magnitude, allowing an input required to commence the operation of the booster to be reduced as compared with the prior art. This allows the operational response of the booster to be improved without accompanying an increase in magnitude of an input required to commence the operation.

Above and other objects, features an advantages of the invention will become apparent from the following description of an embodiment thereof with reference to the attached drawings.

DETAILED DESCRIPTION OF THE EMBODIMENTS

Figure 1:
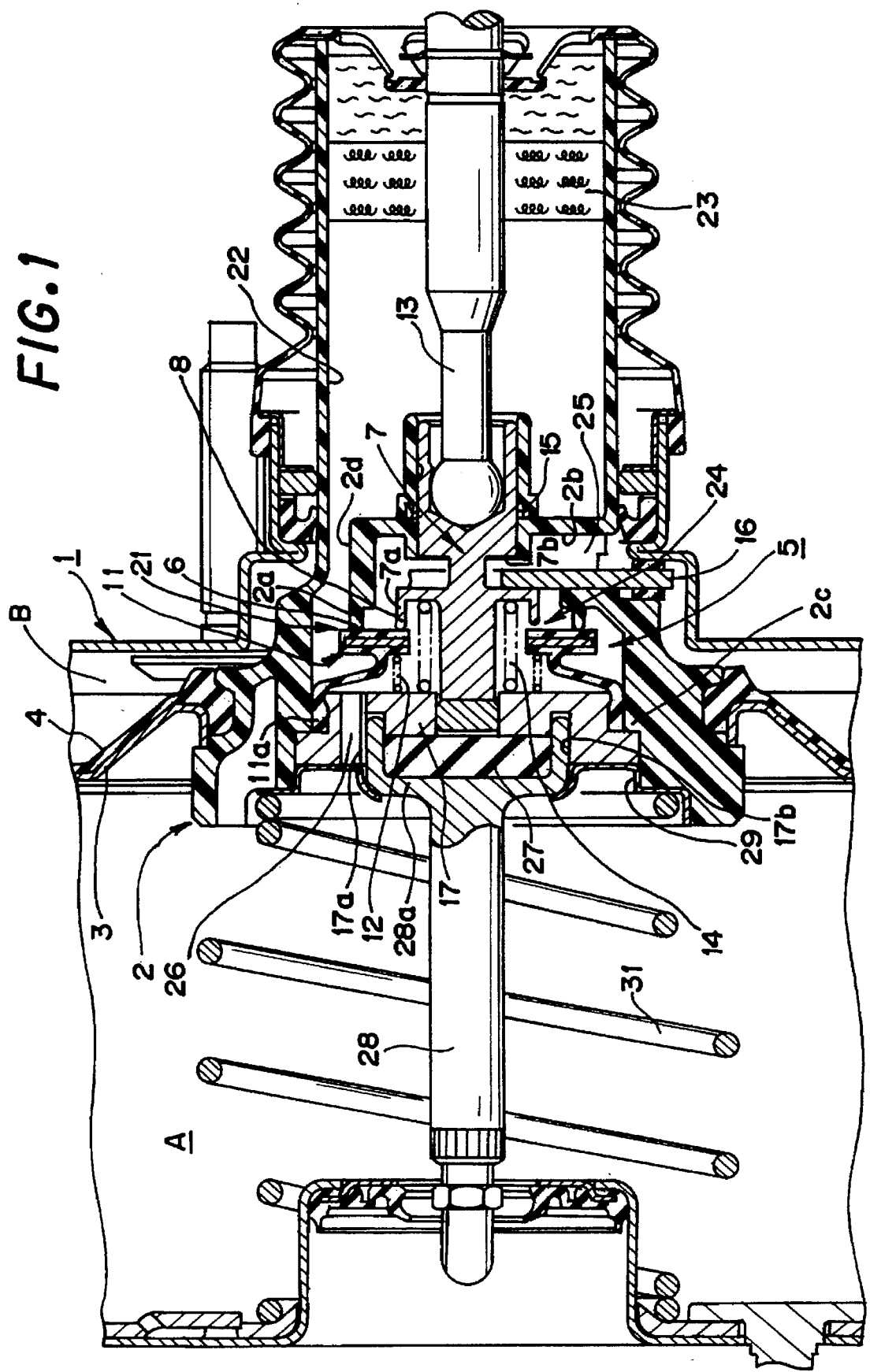
FIG. 1 is a cross section of one embodiment of the invention.

Referring to the drawings for description of an embodiment of the invention, a brake booster includes a shell 1 in which a substantially tubular valve body 2 is slidably disposed as shown in FIG. 1. At its rear end, the outer periphery of the valve body 2 projects externally of the shell 1. A power piston 3 is connected to the outer periphery of the valve body 2, and a diaphragm 4 is applied to the back surface of the power piston 3, thus dividing the interior of the shell 1 into a forwardly located constant pressure chamber A and a rearwardly located variable pressure chamber B.

A valve mechanism 5, which switches a fluid circuit between the constant pressure chamber A, the variable pressure chamber B and the atmosphere, is disposed within the valve body 2. Specifically, the valve mechanism 5 comprises an annular, first valve seat 6 formed on the valve body 2, a valve plunger 7 slidably fitted into the valve body 2, an annular, second valve seat 8 formed on the valve plunger 7, a substantially tubular valve element 11 adapted to be seated upon either valve seat 6, 8, a first spring 12 for urging the valve element 11 so as to be seated upon either valve seat 6, 8, and a second spring 14 for positioning the valve plunger 7 and its connected input shaft 13 to their inoperative positions shown.

The purpose of the present embodiment is to reduce an input required to commence the operation of the brake booster by improving the valve mechanism 5.

Specifically, an annular projection 2a extending forwardly is formed around the inner periphery of the valve body 2, and the distal end of the annular projection 2a defines a first valve seat 6. At its axially central region, the valve plunger 7, which is disposed radially inward of the annular projection 2a, is formed with a tubular portion 7a which extends forwardly from a portion thereof having an increased diameter, the distal end of the tubular portion 7a defining a second valve seat 8. An O-ring 15 is disposed in the inner periphery of the valve body 2 at a location where it is fitted around the rear, outer periphery of the valve plunger 7, thereby maintaining a hermetic seal between the inner periphery of the valve body 2 and the outer periphery of the valve plunger 7. At a location rearward of the tubular portion 7a, the valve plunger 7 is formed with an annular groove 7b, which is engaged by a key member 16 through a radial opening 2b formed in the valve body 2, thus preventing the valve plunger 7 from being disengaged from the valve body 2.

On the other hand, a substantially tubular valve element 11 which is formed of an resilient material is disposed as to face rearward in opposing relationship with the both valve seats 6, 8. At its front end, the valve element 11 has an end 11a of an increased thickness which is fitted around the rear inner periphery of the valve body 2 adjacent to a step 2c formed therein. Under this condition, disposed as a press fit into the end 11a of the valve element 11 is a rear portion of a plug 17, which is stepped and tubular, having a reduced diameter, while a front portion of the plug 17 having an increased diameter is disposed as a press fit into the inner periphery of the valve body 2 at a location forwardly of a step 2c formed therein. In the present embodiment, the plug 17 substantially forms part of the valve body 2.

In this manner, the valve element 11 is connected to the inner periphery of the valve body 2, and a first spring 12 is disposed between the back surface of a seat area of the valve element 11 and an end face of the plug 17. Thus, the resilience of the first spring 12 urges the seat area of the valve element 11 into seating engagement with either valve seat 6, 8.

A second spring 14 is disposed between the end face of the plug 17 and the valve plunger 7, allowing the valve plunger 7 and an input shaft 13 to be maintained at rest in their inoperative positions shown under the resilience of the second spring 14.

In the present embodiment, a combination of the first valve seat 6 formed on the valve body 2 and a seat area of the valve element 11 which moves into and out of engagement therewith defines an atmosphere valve 21. An axial bore 2d is defined outside the atmosphere valve 21, and continues rearward to a space defined between the inner periphery of the valve body 2 and the outer periphery of the input shaft 13, the combination of the axial bore 2d and such space defining an atmospheric passage 22, into which the atmosphere is normally introduced. A filter 23 is disposed in the inside of the valve body 2 which defines the atmospheric passage 22.

A combination of a seat area of the valve element 11 and the second valve seat 8 which moves into and out of engagement therewith defines a vacuum valve 24. A space located rearward of the vacuum valve 24, namely, a clearance between the tubular portion 7a and the annular projection 2a and a radial bore 2b in the valve body 2 which continues therefrom, defines a variable pressure passage 25, which is maintained in communication with the variable pressure chamber B.

A space located radially inward of the vacuum tube 24 and forwardly thereof is defined as a constant pressure passage 26, which is maintained in communication with the constant pressure chamber A. In the present embodiment, the constant pressure passage 26 includes a clearance between the inner periphery of the valve element 11 and the outer periphery of the valve plunger 7, an axial bore 17a in the plug 17 which continues therefrom, and the inner space of the valve body 2 which is located adjacent to the bore 17. A negative pressure is normally introduced into the constant pressure chamber A through a tubing, not shown, which is provided to admit a negative pressure. Accordingly, the negative pressure normally prevails in the constant pressure passage 26.

It will be seen from the above description that in the valve mechanism 5 of the present embodiment, the atmosphere valve 21 is disposed radially outward of the vacuum valve 24 in a manner contrary to the prior art, and the both valve seats 6, 8 and valve element 11 are disposed so as to face in the opposite direction from the prior art. In the present embodiment, the size of the effective diameter of the valve element 11 is chosen to be substantially equal to or slightly greater than the diameter of the atmosphere valve 21.

A stepped bore 17b formed in the axial portion of the plug 17 includes a rear end of a reduced diameter into which the outer periphery of the front end of the valve plunger 7 is slidably fitted from the rear side, and a reaction disk 27 is disposed in abutment against the stepped end face of the stepped bore 17b. The reaction disk 27 is received in a recess formed in an end 28a of a push rod 28, and the distal end of the push rod 28 in which the recess is formed is fitted into an annular groove formed in the stepped end face of the bore 17b.

An annular retainer 29 is fitted into the inner periphery of the valve body 2 from the front side while simultaneously the inner portion of the retainer 29 is disposed in abutment against the end 28a of the push rod 28 and the end face of the plug 17, thereby preventing the end 28a of the push rod 28 and the plug 17 from being withdrawn from the valve body 2. It is to be noted that at a given location, the retainer 29 is formed with a notch so as to prevent the constant pressure passage 26 from being closed.

A return spring 31 is disposed between the retainer 29 which is mounted on the valve body 2 in the manner mentioned above and a front wall of the shell 1, thus urging the valve body 2 and the like rearward so as to be positioned at its inoperative position shown.

In the inoperative condition of the booster shown in FIG. 1, the atmosphere valve 21 which is located radially outward is closed as a result of the seat area of the valve element 11 being urged by the first spring 12 while the vacuum valve 24 which is located radially inward is opened as a result of the valve plunger 7 being urged rearward by the second spring 14. Consequently, the constant pressure chamber A and the variable pressure chamber B are maintained in communication with each other through the constant pressure passage 26 and the variable pressure passage 25, whereby a negative pressure is introduced into the both chambers A and B.

Since the size of the effective diameter of the valve element 11 is chosen to be substantially equal to or slightly greater than the diameter of the atmosphere valve 21 in the present embodiment as described above, the first spring 12 may be set to a load of a magnitude which is sufficient to prevent the valve element 11 from being disengaged from the first valve seat 6 under the influence of a pressure differential between the atmosphere and the negative pressure and which maintains the valve element 11 in abutment against the first valve seat 6. The second spring 14 may be set to a load of a magnitude which is sufficient to push back the valve plunger 7 as it is driven forward under the influence of a pressure differential between the atmosphere and the negative pressure. In addition, since the valve plunger 7 has a reduced outer diameter, it will be seen that the load to which the second spring 14 is set may be chosen to be lower than that used in the prior art. In this manner, the magnitude of an input required to commence the operation of the booster can be reduced.

Accordingly, when a brake pedal is depressed under the inoperative condition mentioned above to drive the input shaft 13 forward, the valve plunger 7 which is coupled to the input shaft 13 is driven forward or to the left, so that the atmosphere valve 21 will be opened after the second spring 14 is compressed to close the vacuum valve 24. This interrupts a communication between the constant pressure chamber A and the variable pressure chamber B in the similar manner as in the prior art, allowing the atmosphere to be introduced into the variable pressure chamber B to produce a pressure differential between the both chambers, thus driving the valve body 2 and the push rod 28 forward to derive an output at a given servo ratio.

It will be noted that in the present embodiment, since the first spring 12 and the second spring 14 are set to a load of a reduced magnitude as mentioned above, the input or the force with which a brake pedal is depressed in order to operate the booster is reduced in magnitude, thus imparting a favorable brake feeling to a driver.

It will also be noted that since the atmosphere valve 21 is located radially outward of the vacuum valve 24, the atmosphere valve 21 has an outer diameter which is greater than that used in the prior art. This allows the atmosphere in the atmospheric passage 22 to be rapidly introduced into the variable pressure chamber B through the variable pressure passage 25 upon commencing the operation of the booster, thus providing a good response of the booster upon commencing the operation thereof.

It will also be noted that the valve mechanism 5 of the present embodiment is simple in construction as compared with the prior art, and exhibits a high reliability, and can be manufactured at a reduced cost.

Figure 2:
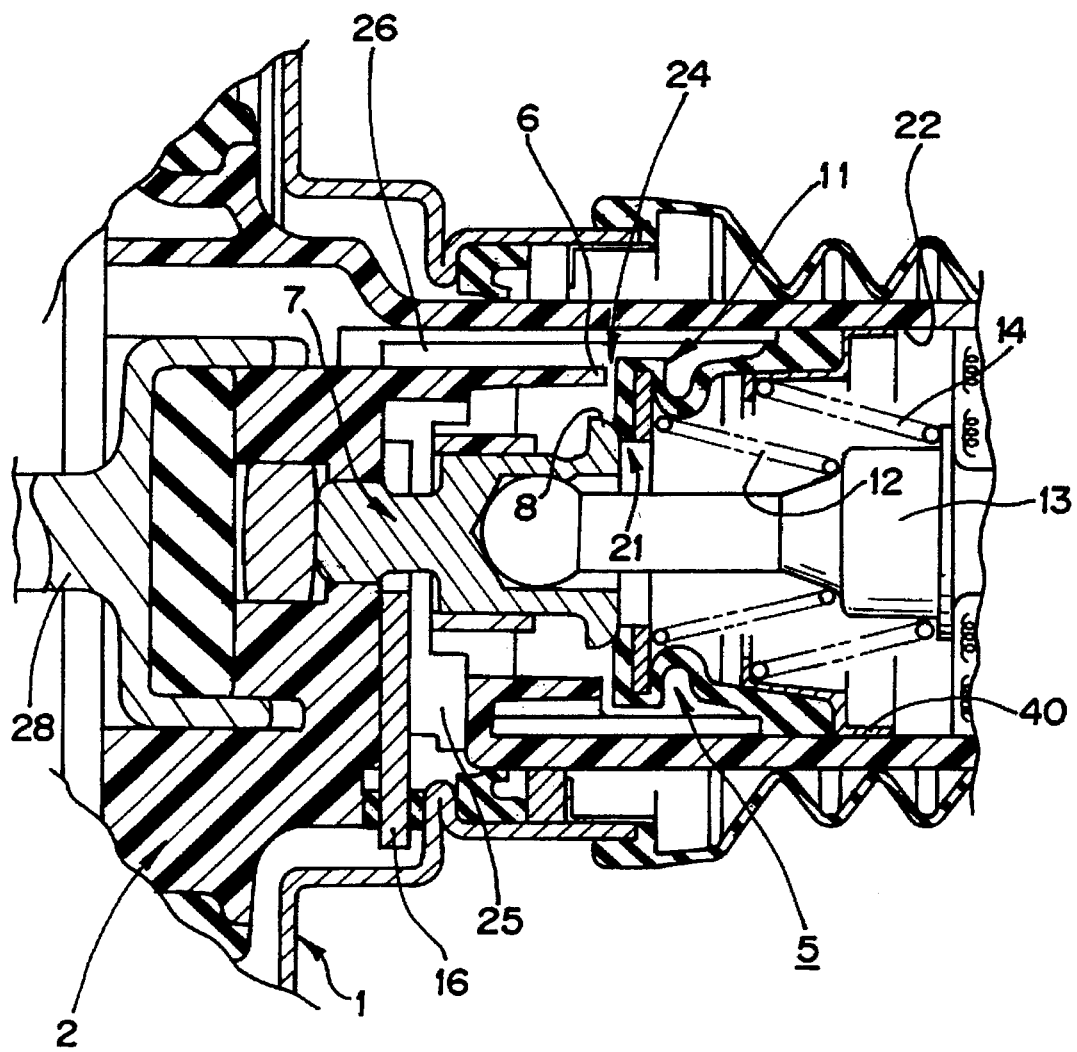
FIG. 2 is a cross section of a conventional valve mechanism.

By contrast, a valve mechanism 5 used in a conventional booster is constructed in a manner illustrated in FIG. 2 such that both valve seats 6, 8 are formed so as to face rearward while a valve element 11 is disposed so as to face forward in opposing relationship with both valve seats 6, 8. In the prior art construction, an atmosphere valve 21 is formed by a second valve seat 8 which is located radially inward and a seat area of the valve element 11 which is adapted to be seated thereon, while a vacuum valve 24 is formed by the first valve seat 6 on the valve body 2 which is located radially outward and a seat area of the valve element 11 which is adapted to be seated thereon. A first spring 12 is disposed between the back surface of the valve element 11 and an input shaft 13, and a second spring 14 which positions a valve plunger 7 and an input shaft 13 at their inoperative positions is disposed between a retainer 40 fitted around the valve body 22 and the input shaft 13.

In the conventional valve mechanism 5 thus constructed, the atmosphere valve 21 is closed while the vacuum valve 24 is open under the inoperative condition shown, a negative pressure then acting upon the outside and the front side of the valve element 11 while the atmospheric pressure acting upon the inside and rear side of the valve element 11. Accordingly, a pressure differential between the inside and the outside of the valve element 11 urges the seat area of the valve element 11 to be urged forwardly while it remains seated upon the second valve seat 8. However, it will be noted that under the inoperative condition, it is necessary to maintain the vacuum tube 24 open so that the seat area of the valve element 11 can not be seated upon the first valve seat 6. Accordingly, it has been necessary to set the second spring 14 to a higher load by an amount which is necessary to overcome the pressure differential. Accordingly, in the prior art construction, an input required to commence the operation by depressing a brake pedal to operate the booster increases in magnitude, degrading a brake feeling experienced by a driver.

In addition, in such a conventional valve mechanism 5, because the atmosphere valve 21 is located radially inward while the vacuum valve 24 is located radially outward of the atmosphere valve 21, if it is attempted to increase the diameter of the atmosphere valve 21 in order to enhance the operational response of the booster, it follows that the magnitude of the pressure differential acting upon the valve element 11 under the inoperative condition increases in magnitude. Accordingly, to accommodate for this, it is necessary that the second spring 14 be set to a higher load, which results in increasing the magnitude of an input required to commence the operation to degrade the brake feeling disadvantageously.

In comparison to the conventional valve mechanism 5 mentioned above, the present embodiment described above allows the operational response to be improved without increasing the magnitude of an input required to commence the operation.

While the invention had been disclosed above in connection with an embodiment thereof, it should be understood that a number of changes, modifications and substitutions therein are possible without departing from the spirit and scoop of the invention defined by the appended Claims.

What is claimed is:

1. A booster including a tubular valve body slidably disposed within a shell and having its outer periphery at its rear end projecting externally of the shell, a power piston mounted on the valve body, a constant pressure chamber and a variable pressure chamber formed across the power piston, a valve mechanism formed within the valve body for controlling opening or closing of a flow path within the valve body in response to a forward or retracting movement of an input shaft, a constant pressure passage for providing a communication between the constant pressure chamber and the valve mechanism, a variable pressure passage for providing a communication between the variable pressure chamber and the valve mechanism, and an atmospheric passage formed by a space defined between an inner periphery of the valve body and an outer periphery of the input shaft and extending from the valve mechanism to a rear opening for providing a communication between the valve mechanism and the atmosphere, the valve mechanism including a first valve seat formed on the valve body, a second valve seat formed on a valve plunger which is slidably fitted in the valve body and located radially inward of the first valve seat, a valve element adopted to be seated upon either valve seat, a first spring for urging the valve element toward either valve seat, and a second spring for returning the valve plunger and its associated input shaft to their inoperative positions;

the improvement wherein both valve seats are formed so as to face forward while the valve element is disposed so as to face rearward in opposing relationship with respect to both valve seats, a combination of the first valve seat and a seat area of the valve element which is seated thereon defining an atmosphere valve which opens or closes the atmospheric passage, and a combination of the second valve seat on the valve plunger and a seat area of the valve element which moves into or out of engagement therewith defining a vacuum valve which opens or closes the constant pressure passage.

2. A booster according to claim 1, in which a front end of the atmospheric passage is located radially outward of the atmosphere valve, the variable pressure passage being formed by an annular space defined between the atmosphere valve and the vacuum valve and a radial bore formed in the valve body and continuing from such space, the constant pressure passage being formed by a space located radially inside the vacuum valve and the valve element and an internal space of the valve body which continues from the first mentioned space.

3. A booster according to claim 2, in which the first spring is disposed between a back surface of the valve element and an end face of a plug which forms part of the valve body, and in which the second spring is disposed between the valve plunger and the end face of the plug.

4. A booster according to one of claims 1 to 3 in which an effective diameter of the valve element is substantially equal to or slightly greater than a diameter of the atmosphere valve.

* * * * *

UNITED STATES PATENT AND TRADEMARK OFFICE
CERTIFICATE OF CORRECTION

PATENT NO. : 5 642 652
DATED : July 1, 1997
INVENTOR(S) : Hidefumi INOUE, et al.

It is certified that error appears in the above-indentified patent and that said Letters Patent is hereby corrected as shown below:

Column 8, line 42; change "one of claims 1 to 3" to
---claim 1,---.

Signed and Sealed this

Eleventh Day of November, 1997

Attest:

BRUCE LEHMAN

Attesting Officer    Commissioner of Patents and Trademarks